(12) United States Patent
Sharp

(10) Patent No.: US 6,378,354 B1
(45) Date of Patent: Apr. 30, 2002

(54) SYSTEM FOR CALIBRATING A DRIVE SIGNAL IN A CORIOLIS FLOWMETER TO CAUSE THE DRIVER TO VIBRATE A CONDUIT IN A DESIRED MODE OF VIBRATION

(75) Inventor: Thomas Dean Sharp, Terrace Park, OH (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/620,750

(22) Filed: Jul. 21, 2000

(51) Int. Cl.[7] ................................................ G01F 1/84

(52) U.S. Cl. ......................................................... 73/1.16

(58) Field of Search ................................. 73/1.02, 1.16, 73/1.82–1.85, 861.355–861.357

(56) References Cited

U.S. PATENT DOCUMENTS 5,804,742 A * 9/1998 Rademacher-Dubbick ................ 73/861.357

* cited by examiner

Primary Examiner—Robert Raevis
(74) Attorney, Agent, or Firm—Faegre & Benson LLP

(57) ABSTRACT

A system for calibrating a drive signal applied to a driver affixed to a conduit to cause the driver to apply a force that vibrates the conduit in a desired mode of vibration. The calibration is completed by first developing a mathematical model of the apparatus and then using the model to mathematically calculate a proper drive signal voltage. The development of a model of the dynamics and calculation of the drive signal voltage are completed by vibrating the conduit, measuring the vibrations of the conduit, detecting physical characteristics of the apparatus from the measured vibrations, and determining a drive signal that causes the driver to oscillate the conduit in a desired mode of vibration responsive to determining the physical characteristics of the apparatus.

21 Claims, 9 Drawing Sheets

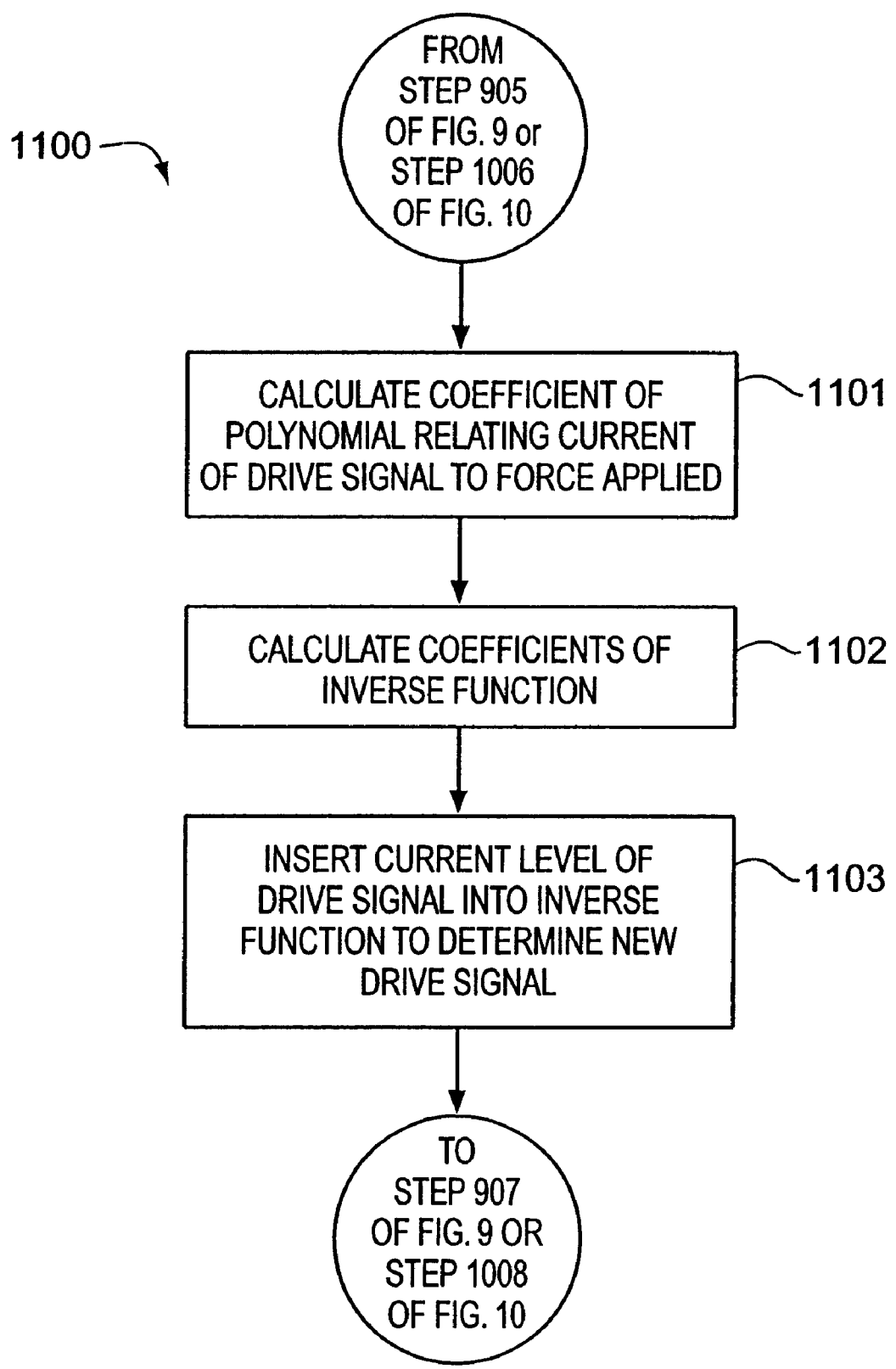

SYSTEM FOR CALIBRATING A DRIVE SIGNAL IN A CORIOLIS FLOWMETER TO CAUSE THE DRIVER TO VIBRATE A CONDUIT IN A DESIRED MODE OF VIBRATION

FIELD OF THE INVENTION

This invention relates to an apparatus for measuring properties of a material flow through apparatus such as a conduit of a Coriolis mass flowmeter. More particularly, this invention relates to calibrating a driver affixed to the conduit to excite the conduits in only a desired mode of vibration. Still more particularly, this invention relates to determining a drive signal that causes the driver to vibrate the conduit in a desired mode of vibration.

STATEMENT OF THE PROBLEM

It is known to use Coriolis effect mass flowmeters to measure mass flow and other information for materials flowing through a conduit in the flowmeter. Exemplary Coriolis flowmeters are disclosed in U.S. Pat. No. 4,109,524 of Aug. 29, 1978, U.S. Pat. No. 4,491,025 of Jan. 1, 1985, and U.S. Pat. No. Re. 31,450 of Feb. 11, 1982, all to J. E. Smith et al. These flowmeters have one or more conduits of a straight or a curved configuration. Each conduit configuration in a Coriolis mass flowmeter has a set of natural modes of vibration, which may be of a simple bending, torsional or coupled type. Each conduit is driven to oscillate at a resonance in one of these natural modes of vibration. Material flows into the flowmeter from a connected pipeline on the inlet side of the flowmeter, is directed through the conduit or conduits, and exits the flowmeter through the outlet side of the flowmeter. The natural vibration modes of the vibrating, material filled system are defined in part by the combined mass of the conduits and the material flowing within the conduits.

When there is no flow through the flowmeter, all points along the conduit oscillate, due to an applied driver force, with identical phase or a small initial fixed phase offset which can be corrected. As material begins to flow, Coriolis forces cause each point along the vibrating conduit to have a different phase. The phase on the inlet side of the conduit lags the driver, while the phase on the outlet side of the conduit leads the driver. Pick-offs are placed on the conduit (s) to produce sinusoidal signals representative of the motion of the conduit(s). Signals output from the pick-offs are processed to determine the phase difference between the signals. The phase difference between two pick-offs signals is proportional to the mass flow rate of material through the conduit(s).

An essential component of every Coriolis flowmeter and of every vibrating tube densitometer is the drive or excitation system. The drive system operates to apply a periodic physical force to the conduit which causes the conduit to oscillate. The drive system includes a driver mechanism mounted to the conduit(s) and a drive circuit for generating a drive signal to operate the drive mechanism. The driver mechanism typically contains one of many well known arrangements, such as a magnet mounted to one conduit and a wire coil mounted to the other conduit in an opposing relationship to the magnet.

The drive circuit continuously applies a periodic drive signal to the drive mechanism. The drive signal is typically sinusoidally or square shaped. In a typical magnetic-coil drive mechanism, the periodic drive signal causes the coil to produce an alternating magnetic field. The alternating magnetic field of the coil and the constant magnetic field produced by the magnet force causes the flow conduit(s) to vibrate in a sinusoidal pattern. Those skilled in the art recognize that any device capable of converting an electrical signal to mechanical force is suitable for application as a driver. (See, U.S. Pat. No. 4,777,833 issued to Carpenter and assigned on its face to Micro Motion, Inc.) Also, one need not use a sinusoidal signal. Any periodic signal may be appropriate as the driver signal (See, U.S. Pat. No. 5,009,109 issued to Kalotay et. al. and assigned on its face to Micro Motion, Inc.).

For a dual tube flowmeter, a typical mode, although not the only mode, in which Coriolis flowmeters are typically driven to vibrate is a first out-of-phase bending mode. The first out-of-phase bending mode is the fundamental resonant bending mode at which the two conduits of a dual tube Coriolis flowmeter vibrate in phase opposition. However, this is not the only mode of vibration present in the vibrating structure of the Coriolis. Higher modes of vibration may be also be excited in the conduits. For example, a first out-of-phase twist mode may be excited as a result of material flowing through the vibrating conduit and the consequent Coriolis forces caused by the flowing material. Other higher modes of vibration that may be excited include in-phase bending and lateral modes of vibration.

Hundreds of vibration modes may be excited in a Coriolis flowmeter that is driven in the first out-of-phase bending mode. Even within a relatively narrow range of frequencies near the first out-of-phase bending mode, there are at least several additional modes of vibration that may be excited by the drive system. In addition to multiple modes being excited by the driver, undesired modes of vibration can also be excited due to vibrations external to the flowmeter. For example, nearby machinery in a process line might generate a vibration that excites an unwanted mode of vibration in a Coriolis flowmeter.

The drive system can excite additional and undesirable modes of vibrations because the driver mechanism is not ideal. The drive system is comprised of the drive circuitry generating a command signal and a driver mechanism that converts the received command signal into a force. An ideal driver mechanism would be linear, and the mechanism would generate a force that is linearly related to the command signal. However, the relationship between the command signal applied to the driver and the force generated by the driver is non-linear due to various reasons. Manufacturing tolerances require that driver elements be located symmetrically on the conduits. Any resulting non-linearity causes a distortion in the drive force, which can appear as forces applied to the structure at harmonics of the original drive signal. The drive system is configured to apply a drive signal to the driver that applies a sufficient force to the conduit(s) to vibrate them in the desired mode of vibration. However, when the driver is not ideal, the force applied to the conduit(s) is not ideal, and forces at higher frequencies are generated. These higher frequency forces may excite other unwanted structural modes.

The application of eccentric forces excites multiple modes of vibration in the conduits. Thus, a Coriolis flowmeter driven to oscillate or resonate in a desired mode of vibration, such as the first out-of-phase bending mode, may actually have a conduit(s) oscillating in many other modes in addition to the desired mode. Meters driven to oscillate in a different mode other than the first out-of-phase bending mode experience the same phenomenon of having multiple excited modes of vibration in addition to the intended drive mode.

The application of eccentric forces by a conduit on a driver can be a particular problem if an apparatus, such as a Coriolis flowmeter, is unbalanced. An apparatus is balanced when vibrations within the apparatus cancel one another out to create a zero sum vibration of the apparatus. Apparatus is unbalanced when vibration are not canceled out. This causes a force to be added to a system. A typical dual conduit apparatus, such as a dual tube Coriolis flowmeter, is balanced because the two conduits vibrate in phase opposition to one another and cancel opposing vibration. However, unbalanced apparatus does not have a conduits vibrating in opposite directions to cancel the vibrational forces from the conduit.

Unbalance can cause significant coupling between the ambient environment and the conduit(s). This coupling increases the impact of structural dynamics of the ambient environment, and may cause an undesired mode of vibration to be excited by a harmonic of the force applied by the driver to the conduit. Therefore, it is desirable in an unbalance apparatus to have a driver applying a force that only excites a desired mode of vibration.

For the above reasons, there is a need for a drive circuit system for vibrating conduits in an apparatus for measuring that drives the vibrating tube(s) of the flowmeter reduces the undesired modes of vibration that are excited by a driver oscillating the conduits.

STATEMENT OF THE SOLUTION

The above and other problems are solved and an advance in the art is achieved by the provision of a system for calibrating a drive signal. The calibration system of the present invention determines the proper drive signal to apply to a driver affixed to a conduit for measuring properties of a material flowing through the conduit. This enables the driver to apply a force that vibrates the conduit in a desired mode of vibration. By determining the proper the drive signal, harmonic forces applied to a conduit by a driver are reduced. This increases the amount of vibration in the desired mode of vibration and reduces the amount of vibrations in undesired modes of vibration. The decrease of vibrations in undesired modes of vibration greatly decreases noise floor to which the flowmeter is subjected. The amplification of the desired response and the decrease in noise allow more accurate measurements of properties, such as mass flow rate to be made. Furthermore, repeatability of measurements is improved.

In order to calibrate the proper drive signal, a pick-off, such as an accelerometer, is affixed to a conduit proximate a driver. A computer or digital processor excites the driver with a broad band noise signal. This causes the driver to apply a band limited noise force to the conduit and the pick-off to measure the motion of the vibrating structure at the driver. The digital processor then receives data about the motion of the structure from the pick-offs. The data is used by the digital processor to generate a dynamic model of the structure and driver. The digital processor uses the dynamic model to determine a drive signal that will cause the driver to apply a force to the conduit which will vibrate the conduit in a desired mode of vibration.

In one embodiment, the digital processor outputs the result to a display or the like and a conventional analog drive circuit connected to the driver is configured to generate the proper drive signal. In the preferred embodiment, the conventional drive circuit can be configured by setting a reference voltage in the drive circuit.

In an alternative embodiment, meter electronics contain a digital signal processor which controls the drive signal applied to the driver. When a digital signal processor is used in the meter electronics, the calibration can be performed periodically by the digital signal processor to adjust the drive signals as the structural dynamic of the apparatus changes. This is done by periodically vibrating the conduits with the driver. The data from vibration is then stored in a memory. The stored data is then used with the data from the current vibration to detect the new structural dynamic of the apparatus and then determine a new drive signal.

An aspect of the invention is a method for calibrating a drive signal to be applied to a driver to cause said driver to oscillate at least one flow tube in a flow measuring apparatus for measuring properties of a material flow in said at least one flow tube, the method comprising the steps of:

vibrating said at least one flow tube with said driver;

measuring vibrations of said at least one flow tube responsive to vibrating said flow tube; and being characterized by the steps of:

detecting physical characteristics of said apparatus and said driver from said measured vibrations of said at least one flow tube; defining a drive signal for said driver in response to the detection of said physical characteristics, and applying said defined drive signal to said driver to oscillate said at least one flow tube in a desired mode of vibration.

Another aspect is a method wherein said flow measuring apparatus is a flowmeter and the method is for calibrating a drive signal to be applied to a driver of said flowmeter, said method being characterized by the steps of:

applying a first signal to said driver to vibrate said at least one flow tube;

measuring vibrations of said at least one flow tube and said driver responsive to vibrating said at least one flow tube when said first signal is applied to said driver;

determining physical vibrational characteristics including any undesired physical vibrational characteristics of said flowmeter including said flow tube and said driver in response to said measurement of said vibrations of said at least one flow tube when said first signal is applied to said driver;

determining a correction factor for said determined physical vibrational characteristics;

utilizing said determined physical vibrational characteristics and said correction factor to define a drive signal to be applied to said driver; and applying said defined drive signal to said driver to oscillate said at least one flow tube in a desired mode of vibration that compensates for said undesired physical vibrational characteristics;

Another aspect is the step of storing a measurement of said vibration of said at least one flow tube where said step of detecting said physical characteristics of said apparatus further comprises the step of:

combining a current measurement of vibrations and said stored measurements of vibrations to determine said physical characteristics.

Another aspect comprises the step of setting a reference voltage in a drive signal circuit responsive to determining said drive signal to cause said drive signal circuit to generate said drive signal.

Another aspect further comprising the step of periodically repeating said method for calibrating said drive signal.

Another aspect is wherein said step of detecting said physical characteristics of said driver and apparatus comprises the step of modeling dynamics of said apparatus and driver from said measured vibrations.

Another aspect further comprising the step of modifying drive circuitry to generate said drive signal.

Another aspect is said step of determining said drive signal comprises the steps of:

calculating coefficients of polynomials for a function relating a drive signal to force applied to said conduits;

determining coefficients of polynomials of an inverse function of said function for relating said drive signal to said force; and inserting a command level of said drive signal into said inverse function to determine said drive signal.

Another aspect comprises meter electronics for an apparatus for measuring properties of a material having at least one flow tube that receives material, a driver for vibrating said at least one flow tube, pick-off sensors for measuring vibrations of said at least one conduit at points along said flow tube, said meter electronics including drive circuitry for applying a drive signal to said driver to cause said drive to oscillate at least flow tube and circuitry for measuring properties of a material flow said at least one flow tube, said meter electronics further comprising the steps of:

first circuitry that receives signals from said pick-off sensors and detects physical characteristics of said apparatus and said driver from said measured vibrations of said at least one flow tube; and second circuitry that determines a drive signal that causes said driver to oscillate said at least one flow tube in a desired mode of vibration from said physical characteristics of said apparatus and said driver.

Another aspect further comprises a memory that stores measurements of vibrations of said at least one flow tube.

Another aspect is that said first circuitry further comprises circuitry that combines a current measurement of vibrations and said stored measurements of vibrations to determine said physical characteristics.

Another aspect comprises a reference voltage in a drive signal circuit set to a level to generate said drive signal responsive to determining said drive signal to cause said drive signal circuit to generate said drive signal.

Another aspect comprises timing circuitry that periodically repeats calibration of said drive signal.

Another aspect is that said first circuitry comprises modeling circuitry that models dynamics of said apparatus and driver from said measured vibrations.

Another aspect is that said second circuitry includes:

circuitry that calculates coefficients of polynomials for a function relating a drive signal to force applied to said conduits;

circuitry that determines coefficients of polynomials of an inverse function of said function for relating said drive signal to said force; and circuitry that inserts a command signal of said current drive signal into said inverse function to determine said drive signal.

Another aspect comprises a product for calibrating a drive signal to apply to a driver to cause said drive to oscillate at least flow tube in an apparatus for measuring properties of a material flowing through said at least one flow tube, said product comprising:

instructions for directing a processor to:

receive signals measuring vibrations of said at least one flow tube from pick-off sensors affixed to said at least one flow tube, and detect physical characteristics of said apparatus and said driver from said measured vibrations of said at least one flow tube, and determine a drive signal that causes said driver to oscillate said at least one flow tube in a desired mode of vibration from said physical characteristics of said apparatus and said driver; and a media readable by said processor that stores said instructions.

Another aspect is that said instructions further comprise instructions directing said processor to apply said drive signal to said driver to cause said driver to oscillate said at least one flow tube in said desired mode.

Another aspect is that said instructions further comprise instructions for directing said processor to store measurements of said vibrations of said at least one flow tube in a memory.

Another aspect is that said instruction for processor to detect said physical characteristics of said apparatus and said driver further comprise:

instructions for directing said processor to read said measurements from said memory and to combine a current measurement of vibrations and said stored measurements of vibrations to determine said physical characteristics.

Another aspect is that said instructions further comprise:

instructions for directing said processor to display a reference voltage for a drive signal circuit responsive to determining said drive signal to cause said drive signal circuit to generate said drive signal.

Another aspect is that said instructions further comprise instructions for directing said processor to periodically repeat calibration said drive signal.

Another aspect is that said instruction for detecting said physical characteristics of said driver and apparatus comprises instructions for directing said processor to model dynamics of said apparatus and driver from said measured vibrations.

Another aspect is that said instructions for directing said processor to determine said drive signal comprises:

instructions for directing said processor to calculate coefficients of polynomials for a function relating a drive signal to force applied to said conduits, determine coefficients of polynomials of an inverse function of said function for relating said drive signal to said force, and insert a command signal of said drive signal into said inverse function to determine said drive signal.

Another aspect comprises a method for calibrating a drive signal for a driver to cause said drive to oscillate at least one flow tube in apparatus for measuring properties of a material flow within said at least one flow tube, said method comprising the steps of:

vibrating said at least one flow tube by said driver;

measuring vibrations of said at least one flow tube responsive to said vibratings;

detecting physical characteristics of said apparatus and said driver from said measured vibrations of said at least one flow tube; and determining a drive signal that causes said driver to oscillate said at least one flow tube in a desired mode of vibration from said physical characteristics of said at least one flow tube and said driver.

DESCRIPTION OF THE DRAWINGS

The above and other features of a drive signal calibration system can be understood from reading the detailed description and the following drawings:

FIG. 11 illustrates further details of elements 906 & 1007.

Figure 1:
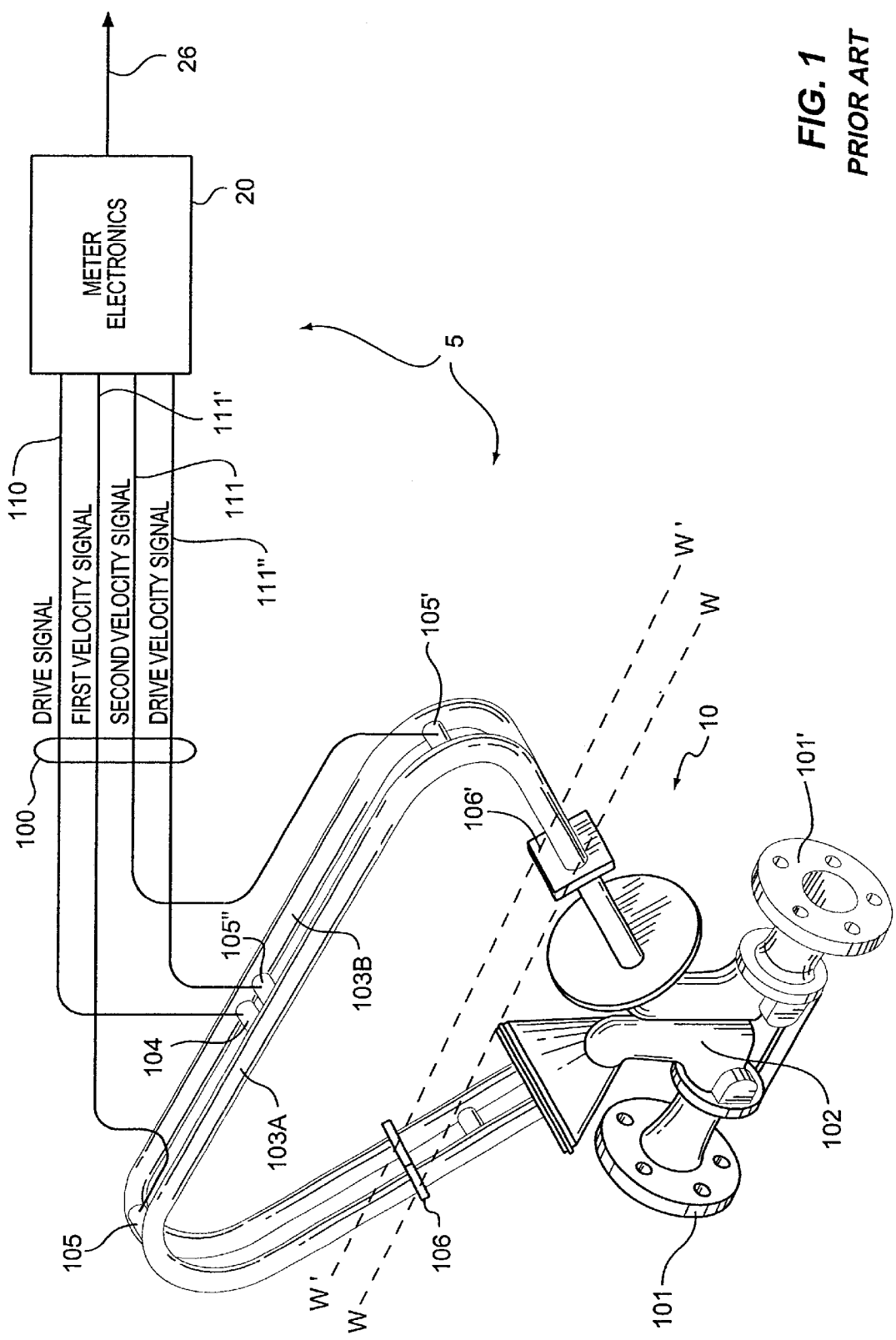
FIG. 1 illustrating a Coriolis Mass Flowmeter incorporating a drive signal calibration system of the present invention.

DETAILED DESCRIPTION
Coriolis Flowmeter in General—FIG. 1

FIG. 1 shows an exemplary Coriolis flowmeter 5 comprising a Coriolis meter assembly 10 and meter electronics 20. Meter electronics 20 is connected to meter assembly 10 via leads 100 to provide density, mass flow rate, volume flow rate and totalized mass flow information over path 26. A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by a Coriolis mass flowmeters.

Meter assembly 10 includes a pair of process connections such as flanges 101 and 101', manifold 102 and conduits 103A and 103B. Connected to conduits 103A and 103B are driver 104, accelerometer 190 and pick-offs sensor 105, and 105'. Brace bars 106 and 106' serve to define the axis W and W' about which each conduit oscillates.

When flowmeter 10 is inserted into a pipeline system (not shown) which carries the process material that is being measured, material enters meter assembly 10 through flange 101, passes through manifold 102 where the material is directed to enter conduits 103A and 103B, flows through conduits 103A and 103B and back into manifold 102 from where it exits meter assembly 10 through flange 101'.

Conduits 103A and 103B are selected and appropriately mounted to the manifold 102 so as to have substantially the same mass distribution, moments of inertia and elastic modulus about bending axes W—W and W'—W', respectively. The conduits 103A–103B extend outwardly from the manifold in an essentially parallel fashion.

Conduits 103A–103B are driven by driver 104 in phase opposition about their respective bending axes W and W'and at what is termed the first out of phase resonant bending mode of the flowmeter. Driver 104 may comprise any one of many well known arrangements, such as a magnet mounted to conduit 103A and an opposing coil mounted to conduit 103B and through which an alternating current is passed for vibrating both conduits. A suitable drive signal is applied by meter electronics 20, via lead 110, to driver 104.

Pick-offs 105 and 105' are placed on opposing ends of at least one conduit 103A and 103B to measure oscillation of the conduits. As the conduit 103A–103 vibrates, pick-offs 105–105' generate a first and a second velocity signal. The first and second velocity signals are applied to leads 111 and 111'. Accelerometer pick-off 105" is affixed to a conduit proximate driver 104 and generates an acceleration signal in response to oscillation of conduit 103A and 103B. The acceleration signal is applied to lead 111" represents the vibrations of flow tubes 103A an 103B.

Meter electronics 20 receives the first and second pick-off velocity signals and driver velocity signal appearing on leads 111, 111' and 111", respectively. Meter electronics 20 processes the first and second velocity signals to compute the mass flow rate, the density, or other property of the material passing through meter assembly 10. This computed information is applied by meter electronics 20 over path 26 to a utilization means (not shown) such as a digital signal processing unit (shown in FIG. 4).

It is known to those skilled in the art that Coriolis flowmeter 5 is similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers. Those skilled in the art recognize that a Coriolis flowmeter already has two feedback signals available, and a vibrating tube densitometer has only one feedback signal typically available. Thus one need only provide additional feedback signals in a vibrating tube densitometer in order to apply the present invention to a vibrating tube densitometer. Furthermore, those skilled in the art will recognize that the processes and method of the following invention can be used in any apparatus which measures property of a material by vibrating a conduit 103A–103B.

Figure 2:
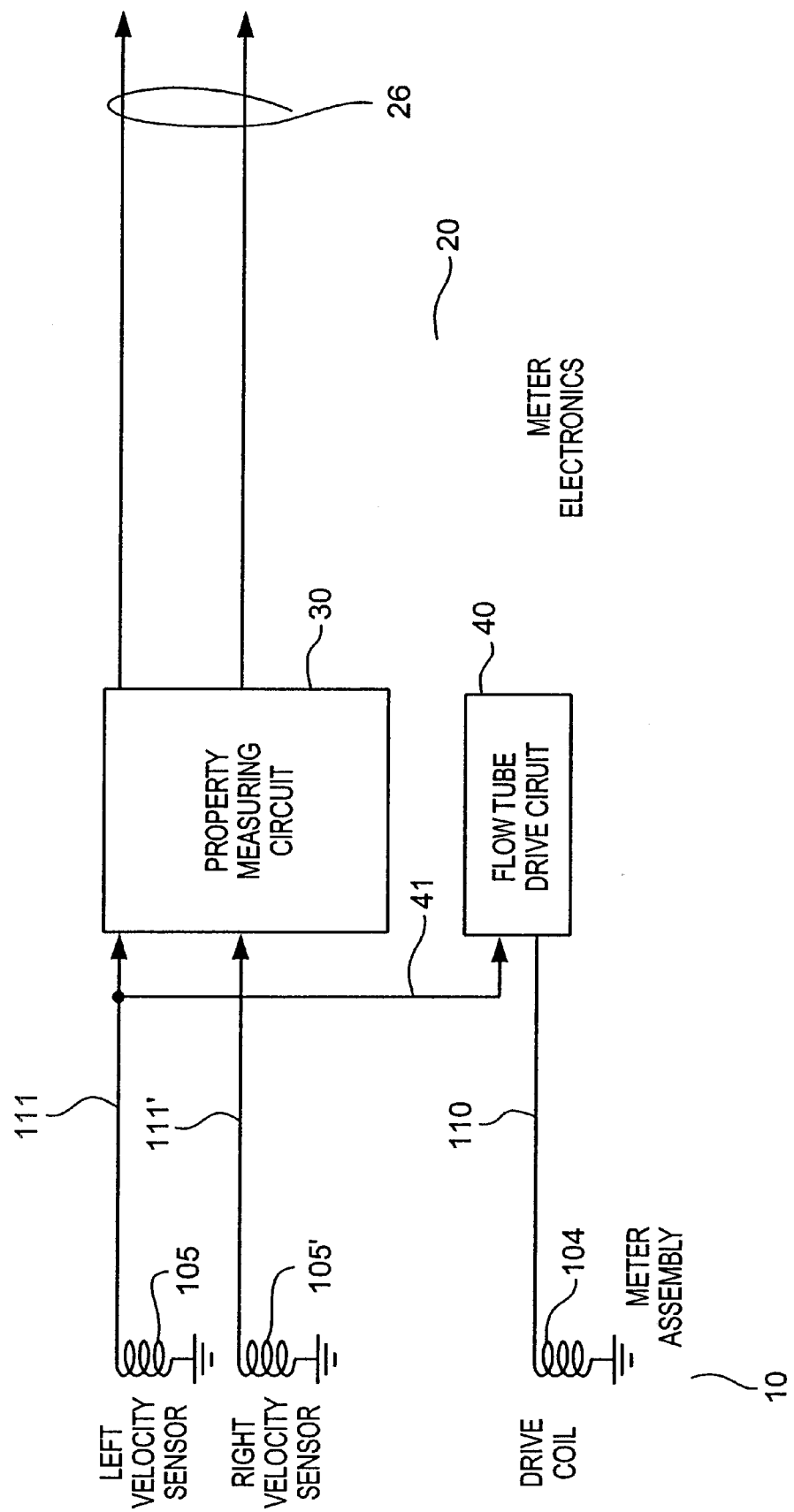
FIG. 2 illustrating meter electronics used in a drive signal calibration system of the present invention.

Meter Electronics—FIG. 2

FIG. 2 depicts further details of meter electronics 20. Meter electronics 20 includes property measuring circuit 30, and flow tube drive circuit 40. Property measuring circuit 30 is one of many known circuits for calculating a property of a material such as the mass flow rate as the material passes through a vibrating conduit 103A–103B based on the difference in phase between two points on the vibrating conduit. Property measuring circuit 30 produces output to a utilization means (not shown) over lines 26. The utilization means might be, for example, a display or a digital processing unit shown in FIG. 4. The details of property measuring circuit 30 are well known to those skilled in the art and do not form part of the present invention. See U.S. Pat. No. RE 31,450 issued to Smith on Nov. 29, 1983 and assigned on its face to Micro Motion, Inc. or U.S. Pat. No. 4,879,911 issued to Zolock on Nov. 14, 1989 and assigned on its face to Micro Motion, Inc. or U.S. Pat. No. 5,231,884 issued to Zolock on Aug. 3, 1993 and assigned on its face to Micro Motion, Inc. for exemplary information regarding a property measuring circuit 30 for determining mass flow rate of the material.

In flowmeter drive circuit systems, drive circuit 40 receives a feedback signal over path 41 from left pick-off 105. As described in more detail with respect to FIG. 3, drive circuit systems applies a drive signal over path 110 to drive coil 104. Those skilled in the art recognize that existing drive systems may alternatively utilize the right pick-off sensor as the feedback to drive circuit 40. Also, some existing drive systems utilize the sum of both pick-off signals as the feedback to drive circuit 40.

Figure 3:
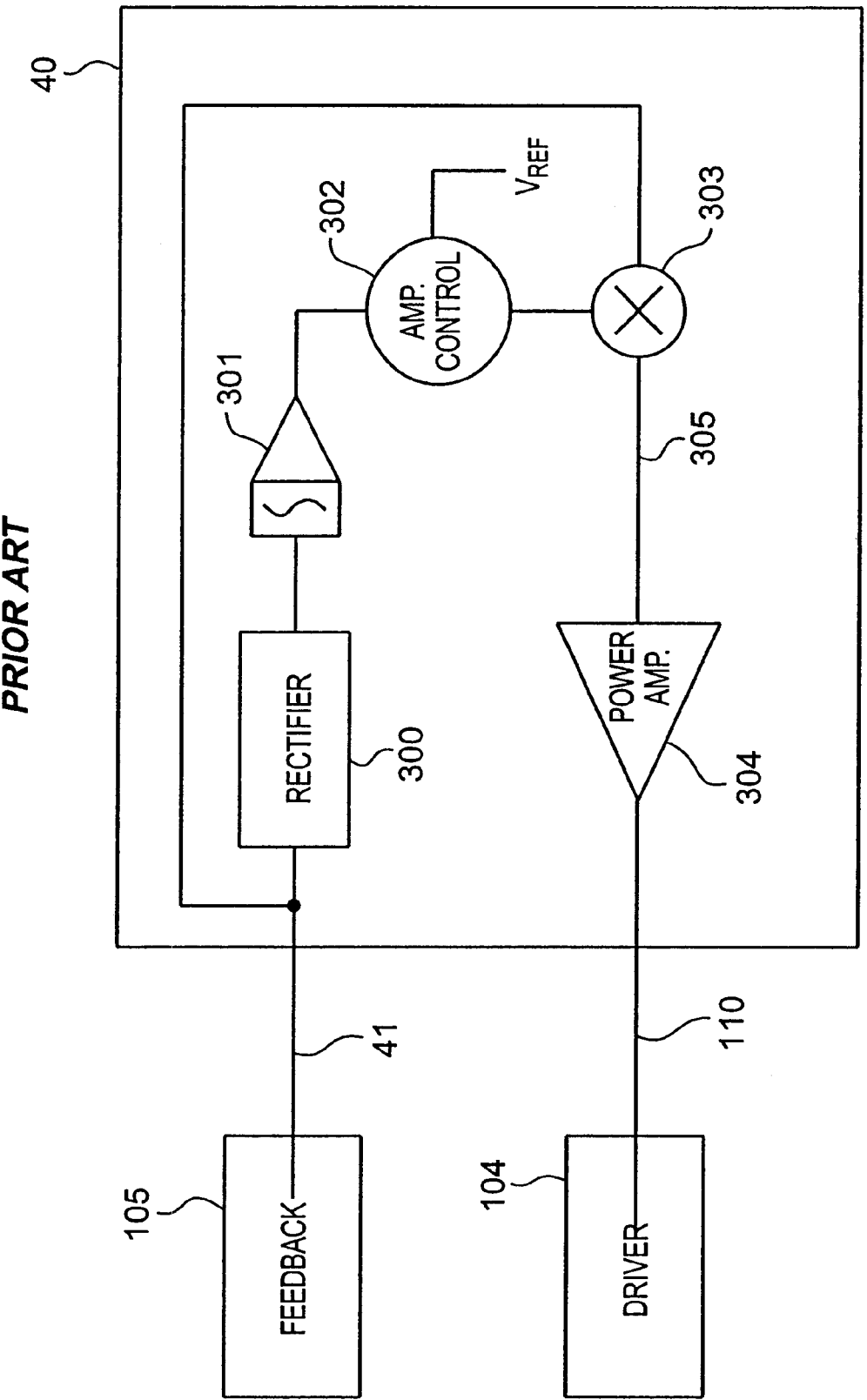
FIG. 3 illustrating a drive circuit that generates a drive signal determined to excite a desired mode of vibration by the drive signal calibration system.

Drive Circuit 40—FIG. 3

FIG. 3 illustrates further details of drive circuit 40. Drive circuit 40 receives a feedback signal on path 41 from one of the pick-offs of the flowmeter and conditions the magnitude of the pick-off signal to apply a drive signal over path 110 to driver 104. As noted, some existing drive systems sum the two pick-off signals and process the summed signal to produce a drive signal. Drive circuit 40 receives a signal from pick-off 105 over path 41. The pick-off signal is through to rectifier 300 to integrator 301. The signal output from integrator 301 represents an average amplitude of pick-off signal 105. The averaged amplitude signal is applied to amplitude control 302. Amplitude control 302 compares the average amplitude signal from integrator 301 with a reference voltage $V_{ref}$. If the average amplitude falls below the reference voltage, the pick-off signal is amplified by multiplier 303 and an amplitude-conditioned pick-off signal is applied to path 305 by multiplier 303. The amplitude conditioned pick-off signal 305 is amplified by power amplifier 304 to produce the final drive signal that is fed over path 110 to driver 104. Thus, drive circuit 40 operates to maintain a relatively constant amplitude drive signal. The details of existing drive control circuitry 40 are well known to those skilled in the art of Coriolis flowmeter electronics and do not form part of the present invention. See U.S. Pat. No. 5,009,109 for a more detailed discussion of multiple embodiments of drive circuit 40.

Figure 4:
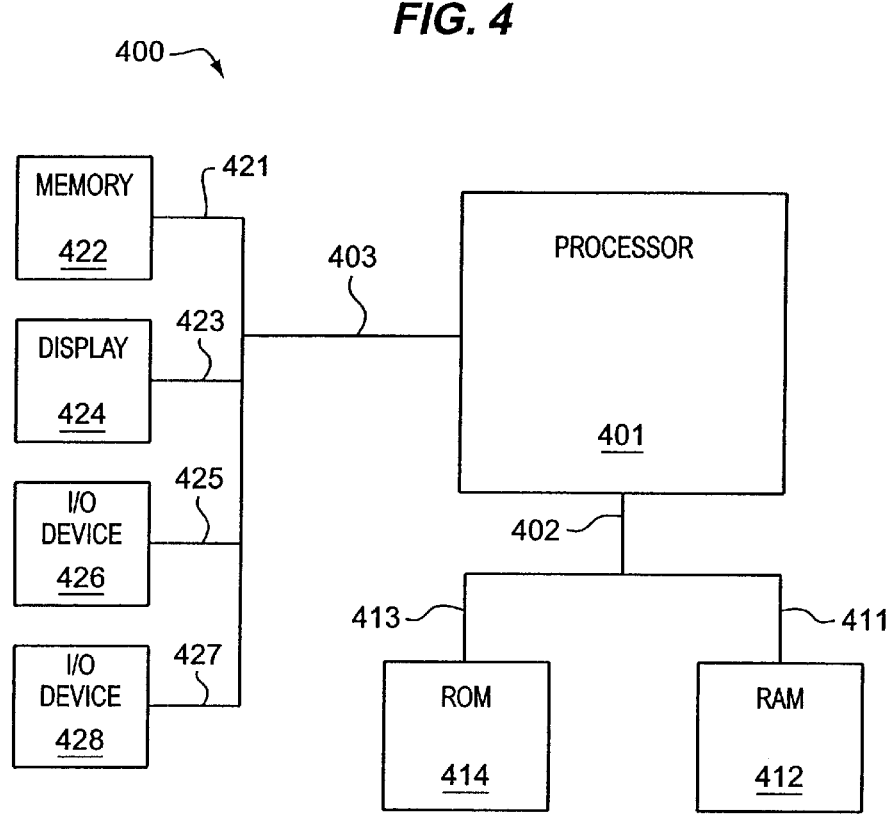
FIG. 4 illustrating a processing unit that performs a calibration of a drive signal.

Digital Processing Unit—FIG. 4

FIG. 4 illustrates a digital processing unit 400 that executes instructions for providing the drive signal calibration of the present invention. Digital processing unit 400 has a processor 401 that executes instructions stored in a memory to perform applications, such as the drive signal calibration of the present invention. Processor 401 may be any conventional processor, microprocessor or a series processors operatively connected to perform a series of instructions.

Processor 401 is connected to a memory bus 402 to read instructions and data from memory and to write data to memory. Random Access Memory (RAM) 412 is a volatile memory connected to memory bus 402 via path 411. RAM 412 stores instructions currently executed by processor 401 and the data needed to perform the instructions. Read Only Memory (ROM) 414 is connected to memory bus 402 via path 413. ROM 414 stores configuration and operating system information needed by processor 401 to execute system routines to allow processor 400 to preform applications.

Processor 401 is also connected to Input/Output ("I/O") bus 403. I/O bus 403 connects processor 401 to periphery devices to allow processor 401 to transmit data to and receive data from periphery devices. Some exemplary devices connected to I/O bus 403 include but are not limited to memory 422, display 424, I/O device 426, and I/O device 428. Memory 422 is connected to I/O bus 403 via path 421 and stores data and instructions for applications that can be executed by processor 401. An example of memory 422 is a magnetic disk drive that read and writes data to a magnetic disk. Display 424 is connected to I/O bus 403 via path 423 and is a device and connected driver that can receive data from processor 401 and display the data in a user understandable manner. For example, display 424 may be a monitor and a video card connected to the bus. Display 424 may also be a device that provides audible sounds from received data.

I/O device 426 is connected to I/O bus 403 via path 425. I/O device 426 is a device that may either receive input data or output data to a user or other machine. Some examples of I/O device 426 include but are not limited to a keyboard, a mouse, a microphone, a Local Area Network (LAN) connection, modem, or equivalent device. I/O device 428 is connected to I/O bus 403 via path 413 and is an I/O device in a preferred exemplary embodiment which receives data from meter electronics 20 via path 26. I/O device 428 converts the data received via path 26 into data that is recognizable by processor 401.

Figure 5:
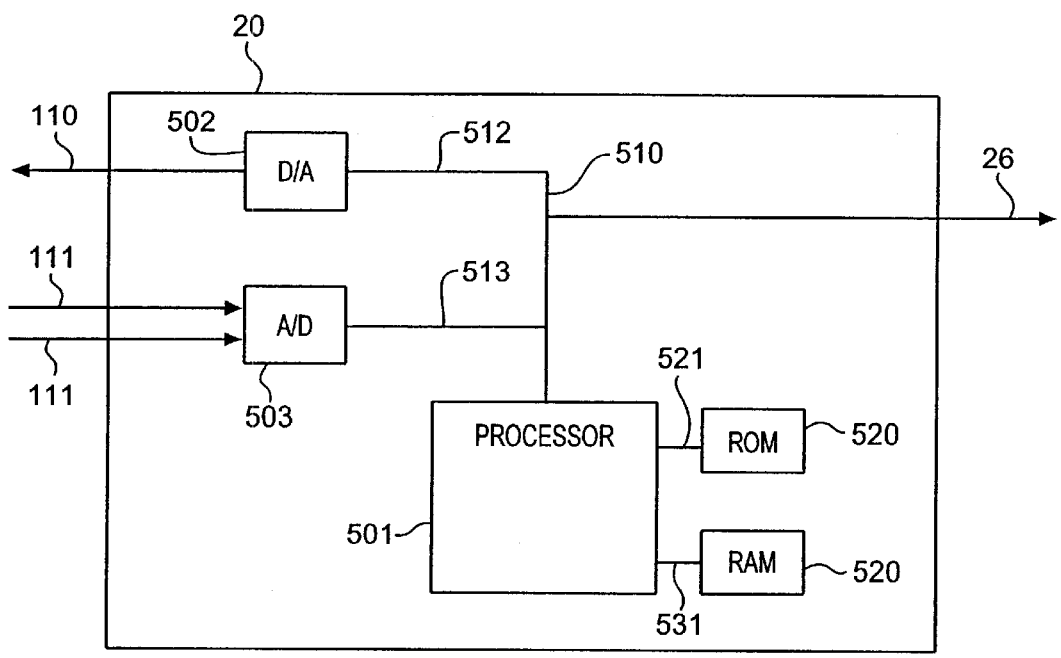
FIG. 5 illustrating a block diagram of a second embodiment of meter electronics 20 which employs a digital transmitter.

A Digital Signal Processor for Meter Electronics 20—FIG. 5

Alternatively, instead of having a digital processing unit 400 connected to meter electronics 20, meter electronics may be a digital signal processor. FIG. 5. illustrates the components of meter electronics 20 in which meter electronics 20 is a digital signal processor. Paths 111 and 111' transmit the left and right velocity signals from flowmeter assembly 10 to meter electronics 20. The velocity signals are received by analog to digital (A/D) convertor 503 in meter electronic 20. A/D convertor 503 converts the left and right velocity signals to digital signals usable by processor 501 and transmits the digital signals over path 513 to I/O bus 510. The digital signals are carried by I/O bus 510 to processor 501. Driver signals are transmitted over I/O bus 510 and path 512 to digital to analog (D/A) convertor 502. The analog signals from D/A convertor 502 are transmitted to driver 104 via path 110. Path 26 is connected to I/O bus 510 and carries signals to input and output means (not shown) which allow meter electronics 20 to receive data from and convey data to an operator.

Processor 501 reads instructions for performing the various functions of the flowmeter including but not limited to computing mass flow rate of a material, computing volume flow rate of a material, and computing density of a material from a Read Only Memory (ROM) 520 via path 521. The data as well as instructions for performing the various functions are stored in a Random Access Memory (RAM) 530. Processor 501 performs read and write operations in RAM memory 530 via path 531.

Underlying Principles of Drive Signal Calibration

The present invention is a system for calibrating a drive signal in an apparatus, such a Coriolis flowmeter 5. A calibrated drive signal is applied to a driver to cause the driver to apply a force to a conduit to vibrate the conduit in a desired mode of vibration. The calibration of a drive signal may be completed before the apparatus is placed into operation in a pipeline or it may be performed periodically while the apparatus measuring properties of a material flowing through the pipeline.

In order to calibrate a drive signal, a mathematical model of Coriolis flowmeter 5 must be generated. For purposes of this discussion, the system of Coriolis flowmeter 5 is assumed to be non-linear, and time invariant. In such a system the relationship between the input and the output does not change over time. The most general way to mathematically model a non-linear, time-invariant system of given by the following equations:

$$\dot{x} = f(x, r) \tag{1}$$

$$y = g(x, r); \text{ and} \tag{2}$$

Where:
- ẋ=all measured vibrations
- x=the state of the system;
- r=the input into the system (the drive signal);
- y=the output of the system; and
- ƒ and g are functions that describe the behavior of the system.

Equations 1 and 2 are too general to be useful for determining the required input needed to generate a desired output, such conduits 103A–103B vibrating in a desired mode of vibration. In using information about the system of Coriolis flowmeter 5, a more specific mathematical form of the model is selected. The flowmeter model can be broken into two subsystems, one representing the mechanical structure of the flowmeter, the other representing the driver that is placed on the structure. The mechanical structure is known to be accurately modeled by an ideal linear system. The driver applies the drive force to the structure and is non-ideal. The driver subsystem is modeled as a non-linear function. For Coriolis flowmeter 5, the following standard state space equations were selected to model the system:

$$\dot{x}=A\,x+Bf_a(r); \tag{3}$$

$$y=Cx+Df_a(r); \tag{4}$$

Where:
- A,B,C,D=are matrices that model the structural dynamics of the Coriolis flowmeter assembly 10;
- $f_a(r)$=the function that models the relationship between the drive command signal and the force generated by the driver.
- r=driver signal.

From equations 3 and 4, it can be seen that the inverse ($f_a^{-1}(r)$) of $f_a(r)$ will compensate for the non-linearity of the system and cause the force applied to conduits 103A and 103B to be linear in a desired mode of vibration over a domain of interest. The exact form the $f_a(r)$ is unknown. One way to approximate $f_a^{-1}(r)$ is with an assumed polynomial as shown below in equation 5.

$$f_a^{-1}(r)=\alpha_0+\alpha_1 r+\alpha_2 r^2+\alpha_3 r^3+\alpha_4 r^4+ \tag{5}$$

where $\alpha_0 \ldots \alpha_4$ are unknown constants.

The order of the polynomial used to approximate $f_a^{-1}(r)$ is determined by the characteristics of non-linearity displayed in the system over a range of values that r (the command signal) may take while driving a flowmeter. In order to calibrate the drive signal, $f_a^{-1}(r)$ is determined, the drive signal is set to $f_{a-1}(r)$; and the resulting dynamic system becomes $$x=Ax+Bf_a(f_a^{-1}(r))\approx Ax+Br; \tag{6}$$

where ($f_a^{-1}(r)$) is a correction factor; (7)

Therefore in order to calibrate the drive signal, $\alpha_0$, $|\epsilon\{0,1,2,3,\ldots\}$ must be determined for a particular driver. For purposes of the present discussion, $f_a(r)$ is approximated by the following polynomial:

$$f_a(r)=\beta_0+\beta_1{}^*r+\beta_2{}^*r^2+\beta_3{}^*r^3+\ldots \tag{8}$$

For clarity a third order polynomial is shown being fit, a different order polynomial can be fit to the data if required. Thus, Equations 3 and 4 can be rewritten as $$\dot{x}=A\,x+B(\beta_0+\beta_1 r+\beta_2 r^2+\beta_3 r^3) \text{ and} \tag{9}$$

$$y=Cx+D(\beta_0+\beta_1{}^*r+\beta_2 r^2+\beta_3 r^3) \tag{10}$$

And finally, $$\dot{x}=Ax+[B\beta_1;B\beta_2;B\beta_3]\cdot[r,r^2 \ldots r^3]^T \tag{10A}$$

$$y=Cx+[D\beta_1;D\beta_2;D\beta_3]\cdot[r,r^2 \ldots r^3]^T \tag{10B}$$

Equations 10A and 10B can be viewed as dynamic equations for a multi-input dynamic system with inputs corresponding to each term of the polynomial, $[r,r^2,r^3]$. Standard multi-input system identification approaches can be used to determine all of the variables associated with the dynamic system. Part II of *System Identification: Theory for the User*, Lennart Lijung, PTR Prentice Hall, Englewood Cliffs, N.J., 1987 contains detailed descriptions of techniques that can be used to estimate the parameters contained in Equations 10A and 10B.

The inverse function (the correction factor), $f_a^{-1}(r)$, must be determined once the variables for the dynamic system have been determined. The inverse function exists because driver 104 has non-linearity that is monotonic over the normal operating range of the apparatus, such as Coriolis flowmeter 5. One manner of determining the inverse function, $f_a^{-1}(r)$, is to fit a polynomial to the inverse function such that the equation $f_{a(r)} \cdot f_a^{-1}(r)=1$. However, other methods can be used to determine the inverse.

The following is an example of calibrating the drive signal applied to a driver 104 to cause driver 104 to vibrate conduits 103A–103B in a desired mode of vibration. Assume driver 104 is modeled by the following equation:

$$f_a(r)=r+0.5r^2+0.3r^3 \tag{11}$$

a discrete structural model of the Coriolis flowmeter 5 in this example is a second order system defined by the follow terms in equations 12, 13, 14 and 15:

$$A = \begin{bmatrix} 1.403 & -.9844 \\ 1 & 0 \end{bmatrix} \tag{12}$$

$$B = \begin{bmatrix} 1 \\ 0 \end{bmatrix} \tag{13}$$

$$C=[1\ 0] \tag{14}$$

$$D=0 \tag{15}$$

The firs step is to use a signal generator to apply a band limited random noise command signal to Coriolis Flowmeter 5 driver and output data from accelerometer 190 is read. Next, the order of the polynomial used to fit the non-linearity is estimated. There is a lot of freedom in the order of the polynomial selected. If an too high a order is selected the terms associated with the higher orders will be small and can be ignored. In this case a $5^{th}$ order polynomial was selected. For each term in the polynomial, an input to the system model is created, turning this single input system into a system with multiple virtual inputs (the physical driver command corresponds to the sum of all of the individual elements).

Each input corresponds to a different term of the polynomial, Equation 8. The inputs become a vector $[r,r^2,r^3,r^4,r^5]$. Standard MIMO identification techniques are used to estimate the parameters of the model. The terms in the B matrix become the coefficients of the non-linearity polynomial. See reference 1 for a discussion of various techniques to estimate these parameters.

Once a model is determined, the B matrix is examined. As can be seen in equation 10A, the B matrix will consist of a column vector that is scaled with the coefficients of the polynomial. Dividing equation (10A) through by the first column of β leads to the polynomial coefficient estimates β.

In the present example, the signal to noise generator was set to a signal to noise ratio of 40 dB. A fifth order polynomial was then used as $f_a(r)$ as a drive signal which produced the following results:

$$f_a(r)=0.9987*r+0.5002*r^2+0.2998*r^3-0.0003*r^4+0.0000*r^5 \quad (16)$$

When Equations 11 and 16 are compared, it is apparent that the system accurately characterizes driver non-linearities. The next step is to take this fitted function $f_a(r)$ of equation 16 and determine the inverse function (correction factor), $f_a^{-1}(r)$. There are different ways of finding this correction factor. The method used here was to evaluate the fitted function, equation 16, over a range of r values. The r values and the $f_a r$ values are then reversed and a least squares procedure is used to fit another polynomial to its inverse. *Numerical Mathematics and Computing*, Ward Cheney and David Kincaid, Brooks/Cole Publishing Company, Monterey, Calif., 1980 discusses the least squares approach that was used. In a preferred embodiment, a $10^{th}$ order polynomial is fit to the inverse.

Figure 6:
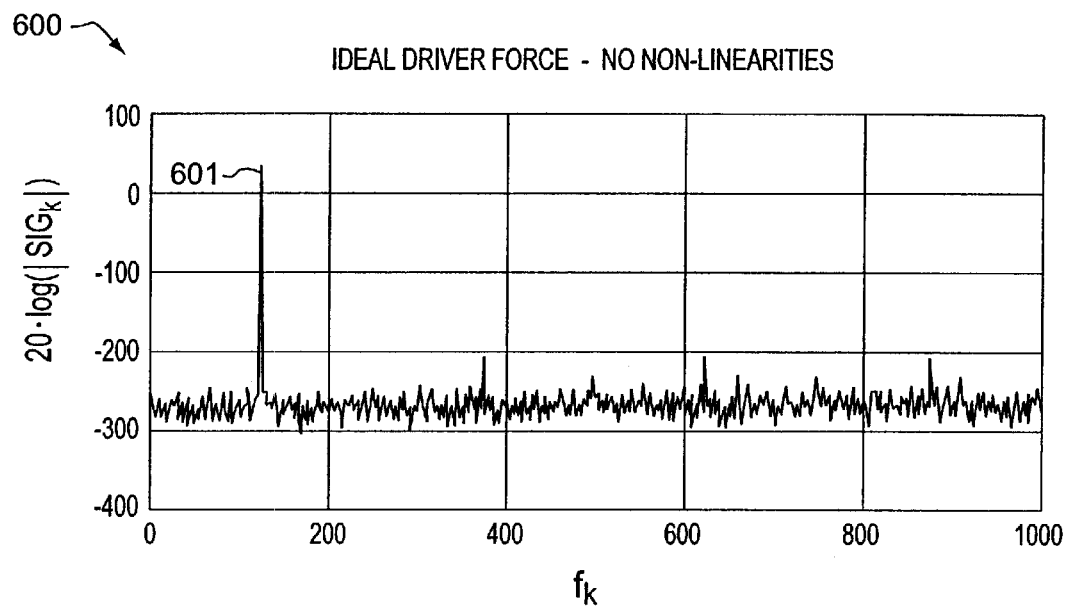
FIG. 6 illustrating a graph of the vibration of a conduit being oscillated by a ideal drive system.
Figure 7:
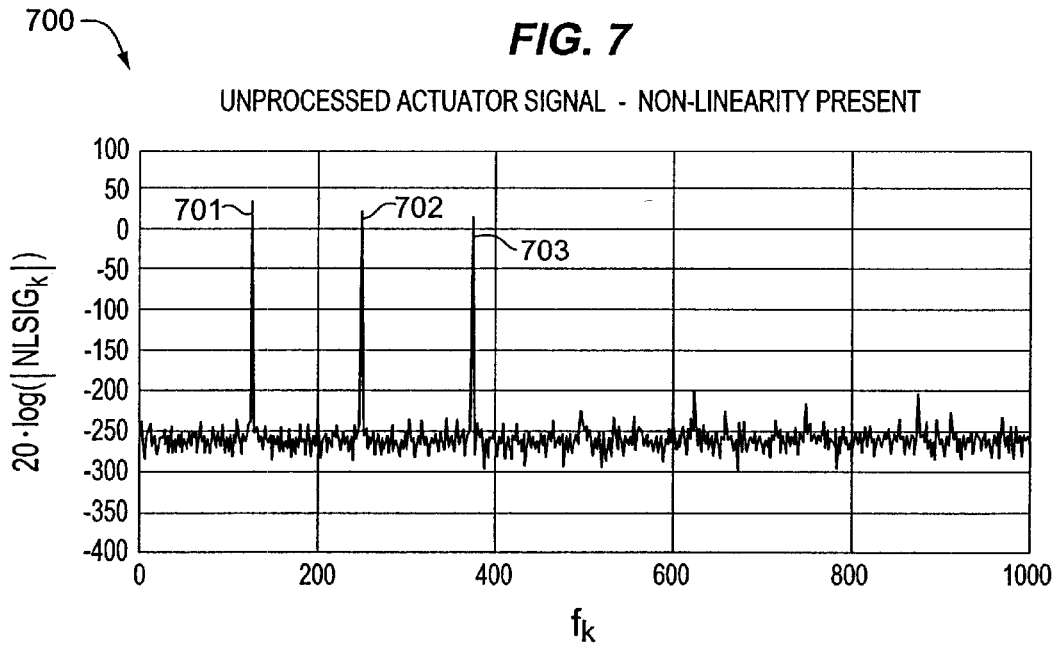
FIG. 7 illustrating a graph of the vibration of a conduit being oscillated by a typical, non-ideal drive system.

The correction factor is then used to determine calibrated drive signal of equation (5) to be applied to driver 104. The calibrated drive signal is determined by evaluating the inverse function at the non-calibrated command signal. The calibrated command signal is then applied to driver 104. FIG. 7 illustrates the vibration of a conduit in a Coriolis flow in which the drive signal has not been calibrated. A first peak 701 at about 125 HZ represents a vibration in a first bending mode of vibration. First peak 701 represents the desired mode of vibration in a preferred embodiment of the present invention. 702 and 703 represents the component of the vibration that is caused by the non-linearities of the actuator. These components are at 250 and 375 Hz respectively. FIG. 6 illustrates a graph showing a vibration of conduit 103A–103B when an ideal drive signal has been applied to driver 104 in a preferred exemplary embodiment. It can be seen that only peak 601 occurs in the frequency of vibration at about 125 Hz which is the first bending mode of vibration which is the desired mode of vibration in the preferred embodiment of the present invention.

Figure 8:
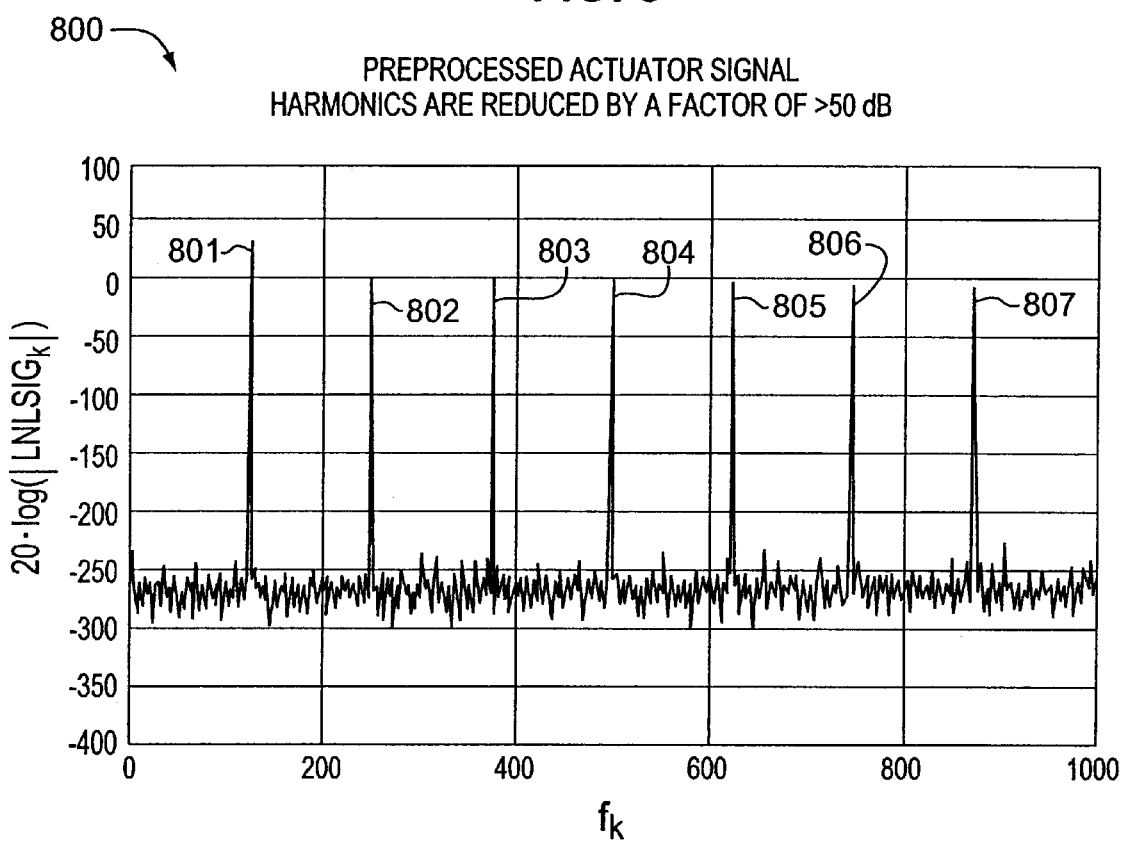
FIG. 8 illustrating a graph of the actual vibration of a conduit oscillated by a drive system having a calibrated drive signal.

FIG. 8 illustrates a graph of the vibrations of a conduit 103A–103B caused by a calibrated drive signal being applied to driver 104 in a second embodiment. In this embodiment the calibrated drive signal does not cause the elimination of all harmonics of the desired mode of vibration. Instead, the calibrated drive signal causes the resulting harmonic signals to be reduced by a factor of greater than 50 dB.

Peak 801 is a peak representing the vibration in the desired mode of vibration, namely the first bending mode of vibration. Peaks 802–807 represent vibrations at harmonics of the desired mode of vibration. In a comparison of FIG. 8 and FIG. 6, it is apparent that the calibrated drive signal has caused the conduit to vibrate in a greater number of harmonics than if the conduits had been driven by an uncalibrated signal. However, the level of each of the harmonics has been reduced by greater than 50 dB, which corresponds to a reduction of more than a factor of 100 and can be easily filtered out of the received signals.

Figure 9:
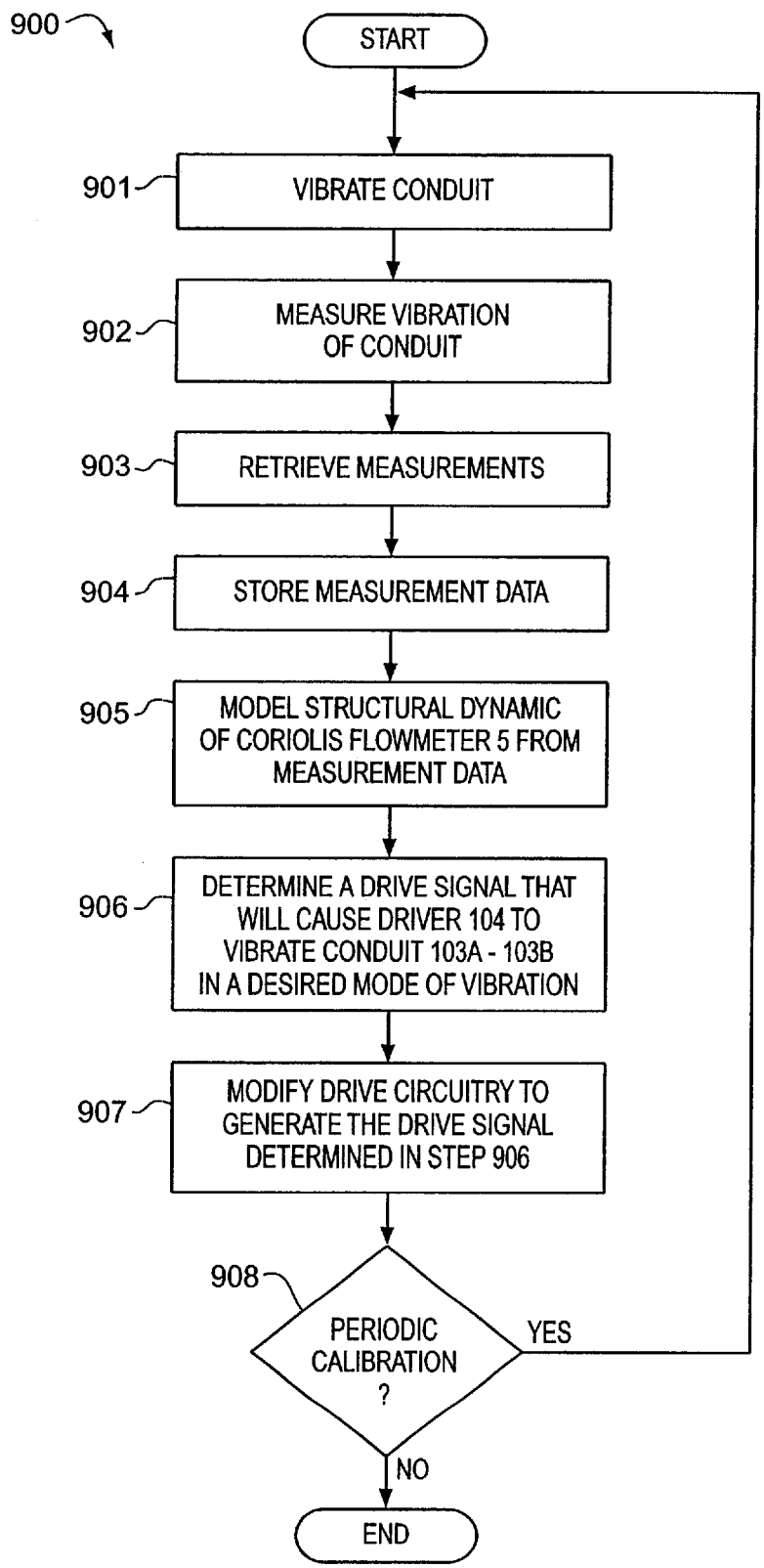
FIG. 9 illustrating a flow diagram of a method for calibrating a drive signal.

Method for Calibrating a drive Signal for Coriolis Flowmeter 5—FIG. 9 FIG. 9 illustrates a flow chart of method 900 which are the steps taken to perform calibration of a drive signal for Coriolis flowmeter 5. Method 900 begins in step 901 by vibrating conduit 103A–103B. As noted above, in the explanation of the calibration process, conduits 103A–103B are vibrated by applying random noise to driver 104 in a preferred exemplary embodiment. In step 902, the vibrations of conduits 103A–103B are measured responsive to the conduits being vibrated. The measurements are received in step 903. Measurements may include data from accelerometer 190 and pick-offs 105–105'. Measurement data may be stored in a memory or other storage device in step 904 for use in future calibrations of the drive signal.

A model of the dynamics of Coriolis flowmeter 5 is generated in step 905 responsive to obtaining the measurement in step 903. The model of the dynamics may be generated using just the measurements from step 903 or may be generated using the measurement data that has been received and stored in step 903. In step 906, the dynamic model of Coriolis flowmeter 5 generated in step 905 is used to determine the proper drive signal to apply to driver 104 in order to vibrate the conduits in a desired mode of vibration. In step 907, the drive circuit is then configured to apply the desired drive signal to driver 104. One manner in which the drive signal can be modified is to change the reference voltage in a drive circuit. Alternatively, a digital signal processor can store a proper voltage to memory and apply the voltage to drive 104 when needed.

In decision step 908, it is determined if method 900 is to be repeated periodically. If method 900 is not periodically repeated to re-calibrate the drive signal, method 900 ends. Otherwise method 900 is repeated from step 901. The idea behind periodically repeating method 900 is to calibrate the drive signal periodically in order to adjust the drive signal to compensate for any changes in the dynamics of the system due to wear of components in Coriolis flowmeter 5.

Figure 10:
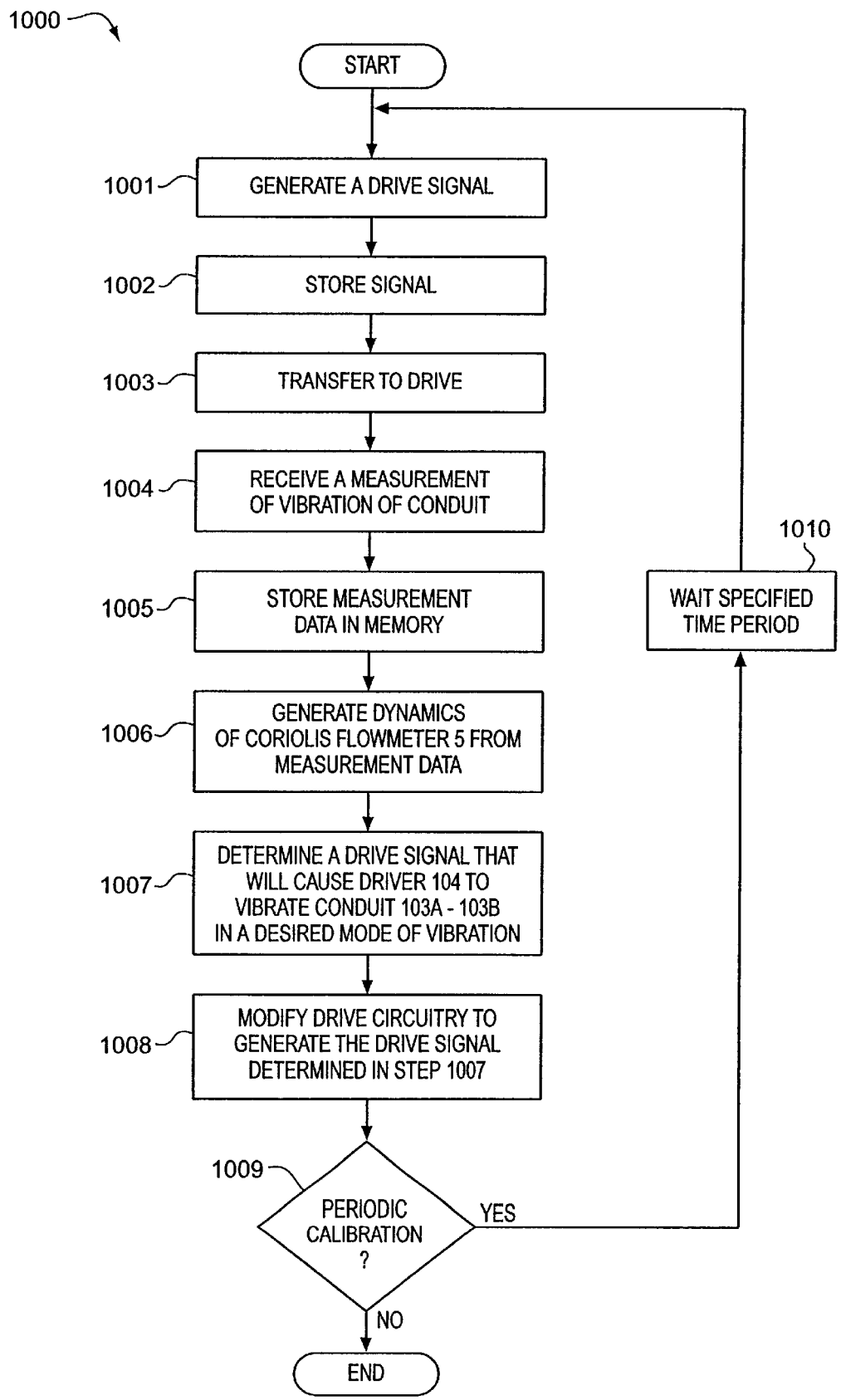
FIG. 10 illustrating a process performed by a digital processor to perform a calibration of the drive signal.

Process by which Digital Processor Performs Calibration—FIG. 10

FIG. 10 illustrates process 1000 which is the steps performed by a processor such as processing unit 400 or digital signal processor 500 in order to perform method 900 shown in FIG. 9. Instructions stored in a memory connected to the processor contains the instructions that are executed by the processor to perform the steps of process 1000. It is left to those skilled in the art to write executable applications to perform the steps of process 1000.

Process 1000 begins in step 1001 by generating a drive signal. As noted above, in a preferred embodiment the drive signal generated is random noise. In step 1002, the signal generated is stored for use in generating a structural dynamics model of Coriolis flowmeter 5. The generated drive signal is then transmitted to driver 104 in step 1003. Driver 104 vibrates conduits 103A–103B in response to receiving a drive signal. Accelerometer 190 and pick-offs 105–105' measure the vibrations of conduits 103A–103B and transmit measurement data to the transmitter in response to driver 104 vibrating the flow tubes.

In step 1004, the measurement data from accelerometer 1004 and pick-offs 105–105' is received by the processor. In response to receiving the measurement data, the processor stores the data in a connected memory in step 1005. A model of the structural dynamics of Coriolis flowmeter 5 is generated in step 1006 in response to a reception of measurement data in step 1004. The dynamic model may be generated from either just the data received in step 1004 or may be generated from the data received in step 1004 and from data stored in memory from previous measurements.

In step 1006, the dynamic model generated in step 1005 is used to determine the proper drive signal to be applied to driver 104 to cause driver 104 to vibrate conduits 103A–103B in a desired mode of vibration. One possible exemplary process of determining the proper drive signal is provided below. The drive circuitry is then modified in step 1007 to provide the proper drive signal as determined in step 1006. One manner in which the drive signal can be modified is to change the reference voltage in a drive circuit. Alternatively, a digital signal processor can store a proper voltage to memory and apply the voltage to drive 104 when needed.

In decision step 1008, it is determined if process 1000 is to be repeated periodically. If process 1000 is not to be periodically repeated to re-calibrate the drive signal, process 1000 ends. Otherwise, the processor starts a counter and waits a predetermined amount of time in step 1010. After the predetermined amount of time expires process 1000 is repeated from step 1001. The idea behind periodically repeating process 1000 is to calibrate the drive signal periodically in order to adjust the drive signal to compensate for any changes in the dynamics of the system due to wear of components in Coriolis flowmeter 5.

An Exemplary Process or Method for Determining the Proper Drive Signal—FIG. 11

FIG. 11 discloses further details of elements 906 and 1007 and it illustrates one exemplary process 1100 or method as described above to determine the proper drive signal to apply to driver 104 in order to vibrate conduits 103A–103B in a desired mode of vibration. Process 1100 begins in step 1101 in which the dynamic model generated from the vibration measurement data is used to calculate the coefficients in the polynomial function that models the force applied to a conduit 103A–103B in response to a drive signal. Once the coefficients of the polynomial function are determined, the coefficients of the inverse function are determined in steps 1102 using the coefficients of the force as determined in step 1101. The drive command signal is then inserted into the polynomial representing the inverse function in step 1103 to determine the proper command for a drive to be applied to driver 104. Process 1100 ends after step 1103.

SUMMARY

The invention as described relates to the calibration of Coriolis flowmeters, and more specifically, to the calibration of the associated drive signal.

The Coriolis flowmeter consists of at least one conduit, an example of which is shown in FIG. 1 comprising two conduits, such as conduits 103A and 103B. The conduits are vibrated by a drive signal being applied to a driver attached to the conduits. The driver is a physical structure which may consist of a magnet and an opposing coil. The drive signal 110 is a periodic wave form such as a sine wave and is provided by meter electronics 20, also seen in FIG. 1. Although other periodic wave forms of drive signals may be used, the drive signal for the described embodiment is a sine wave with a frequency of 125 Hertz (Hz). Measurements relating to a substance passing through the flowmeter, such as mass flow rate, mass density, and others, are made from pick-off signals emanating from the conduits. The measurements are determined from deviations in frequency and phase of the drive signal as the substance passes through the flowmeter.

It is essential for the drive signal to be calibrated to make accurate measurements of the substance passing through the flowmeter. However, measurement inaccuracies can exist due to structural variations in conduits and drivers across individual flowmeters. The structural variations can produce unwanted, non-linear responses, such as drive signal harmonics. The drive signal harmonics raise a noise floor and vibrate the conduits in an unanticipated manner, thereby creating inaccurate measurements.

The described invention solves the problem of the unwanted drive signal harmonics through the novel approach of applying a priori knowledge of the output to the drive signal. First, the Coriolis flowmeter is characterized by applying a test drive signal to the driver of the Coriolis flowmeter, which is an actual physical structure. An accelerometer then collects data relative to the vibrations created in the flow tubes by the test drive signal. This system can be characterized as a single input—single output system, having a transfer function equivalent to the output divided by the input. State space equations of the Coriolis flowmeter system can be written to include the inputs, outputs, and structural characteristics of each individual flowmeter. The state space equations are written as $$\dot{x} = Ax + Bf_a(r)$$

$$y = Cx + Df_a(r),$$

where A, B, C, and D are state space matrices comprising coefficients representing the structural parameters of each individual flowmeter, and $f_A(r)$ is a polynomial function representative of the drive signal, as shown previously in equations 1 and 2.

A transformation from the single input—single output system to a multiple input—single output system can be fashioned by constructing multiple inputs from the original signal to a predetermined number of polynomial terms. For example, to create a multiple input signal comprising higher order components, from a single signal such as a sine of the form $$f_A(r) = \alpha \sin(2\pi f t),$$

where $\alpha$ is a scalar, $f$ is frequency and $t$ is time, the polynomial order must be predetermined. Multiple inputs to the system are then created by the number of desired polynomial terms, such as $$f_A(r) = \alpha \sin(2\pi f t) + \alpha^2 \sin(2\pi f t)^2 + \alpha^3 \sin(2\pi f t)^3 + \ldots + \alpha^n \sin(2\pi f t)^n.$$

Although any polynomial order may be chosen, for the purposes of this invention it was determined that a $5^{th}$ order polynomial would suffice since higher order components tend to negligibly affect the overall system. Since the input, now characterized by the multiple input signal, and the output signal of the Coriolis flowmeter system are known, the system can be characterized by its transfer function. The state space matrices A, B, C, and D, can be resolved by transforming the transfer function into its controllable canonical form. Similar teachings are well known to those skilled in the art and can be found in such references as the earlier mentioned reference of Lennart Ljung.

Once the system is characterized by it transfer function, the state space matrices A, B, C, and D matrices are constructed into a controllable canonical form, which is well known to those skilled in the art. From the controllable canonical form, the coefficients of the B matrix are used to construct a signal compensator. The signal compensator is of the form rewritten as $$\dot{x} = Ax + B(\beta_0 + \beta_1 r + \beta_2 r^2 + \beta_3 r^3 + \beta_3 r^4 + \beta_3 r^5)$$

$$y = Cx + D(\beta_0 + \beta_1 r + \beta_2 r^2 + \beta_3 r^3 + \beta_3 r^4 + \beta_3 r^5),$$

where the β coefficients are now represented by the B matrix coefficients of the previously mentioned controllable canonical form, and r is still the input signal.

Once the β coefficients are determined, a drive signal is inputted to the system. The output results in a new set of data. The new output data is curved fitted using a least squares algorithm, also well known to those skilled in the art. The least squares curve fit generates a polynomial of a predetermined order. Once the polynomial is generated, an inverse of the polynomial is then calculated and a non test drive signal is evaluated against the inverse polynomial.

To illustrate, Coriolis flowmeter was inputted with a test signal which comprised of broad band noise. A second order system was predetermined as sufficient for an example. The transfer function was created and resulted in state space matrices A, B, C, and D of $$A = \begin{bmatrix} 1.403 & -.9844 \\ 1 & 0 \end{bmatrix}$$

$$B = \begin{bmatrix} 1 \\ 0 \end{bmatrix}$$

$$C = [1\ 0]$$

$$D = 0$$

when written in the controllable canonical from.

A drive signal comprising of a 125 Hz sine wave having a 40 decibel (dB) signal to noise ratio (SNR) was applied to the system. The drive signal was formatted into a polynomial function of the form $$f_A(r) = r + 0.5r^2 + 0.3r^3,$$

where r is the drive signal, as shown in equation 11. The coefficients of the signal were based on heuristic data of actual flowmeter outputs with non-linear harmonic components and used here only as an example. The above function is then applied to the known state space structural parameters of the Coriolis flowmeter as shown in equations 1 and 2. A power spectral display (PSD) of the outputted data representative of an accelerometers reveals the resultant drive signal harmonics as seen in FIG. 7. The outputted data is curve fitted using a least squares algorithm of the form of a $5^{th}$ order polynomial function. The least squares algorithm produced a polynomial function of $$f_A(r) = 0.9987*r + 0.5002r^2 + 0.2998r^3 - 0.0003r^4 + 0.0000r^5,$$

as shown in equation 8. An inverse polynomial function of the above curve fitted $f_A(r)$ was calculated. The inverse polynomial function is stored in a memory location of the meter electronics, such as that of meter electronics 20 in FIG. 1. The inverse polynomial function is applied to the drive signal by means of evaluating the inverse polynomial function with sampled values of the drive signal. For example, a sample of the drive signal is inputted to the inverse polynomial function and the result is an output sample representing a compensated sample of the drive signal. The entire process produces an amplitude reduction of drive signal harmonics, as seen by the PSD of FIG. 8.

Previously, drive signal harmonics comprised enough amplitude to unpredictably vibrate the Coriolis flow tubes. This novel method, as taught, substantially decreases the amplitude of the drive signal harmonics to the point of being almost negligible. Although results may vary, the above example effectively decreased drive signal harmonics by greater than 20 dB, and no harmonic was greater than 0 dB.

What is claimed is:

1. A method for calibrating a drive signal to be applied to a driver to cause said driver to oscillate at least one flow tube in a flowmeter for measuring properties of a material flow in said at least one flow tube, the method comprising the steps of:
   applying a first signal to said driver to vibrate said at least one flow tube;
   vibrating said at least one flow tube with said driver;
   measuring vibrations of said at least one flow tube and said driver responsive to vibrating said at least one flow tube when said first signal is applied to said driver;
   determining physical vibrational characteristics including any undesired physical characteristics of said flowmeter including said flow tube and said driver in response to said measurement of said vibrations of said at least one flow tube when said first signal is applied to said driver;
   determining a correction factor for said determined physical vibrational characteristics;
   utilizing said determined physical vibrational characteristics and said correction factor to define a drive signal to be applied to said driver; and
   applying said defined drive signal to said driver to oscillate said at least one flow tube in a desired mode of vibration that compensates for said undesired physical vibrational characteristics.

2. The method of claim 1 further comprising the step of:
   storing a measurement of said vibration of said at least one flow tube.

3. The method of claim 2 wherein said step of detecting said physical characteristics of said apparatus further comprises the step of:
   combining a present measurement of vibrations and said stored measurements of vibrations to determine said physical characteristics.

4. The method of claim 1 further comprising the step of:
   setting a reference voltage in a drive signal circuit responsive to determining said drive signal to cause said drive signal circuit to generate said drive signal.

5. The method of claim 1 further comprising the step of:
   periodically repeating said method for calibrating said drive signal.

6. The method of claim 1 wherein said step of detecting said physical characteristics of said driver and apparatus comprises the step of:
   modeling dynamics of said apparatus and driver from said measured vibrations.

7. The method of claim 1 further comprising the step of:
   modifying drive circuitry to generate said drive signal.

8. The method of claim 1 wherein said step of determining said drive signal comprises the steps of:
   calculating coefficients of polynomials for a function relating a drive signal to force applied to said conduits;
   determining coefficients of polynomials of an inverse function of said function for relating said drive signal to said force; and
   inserting a command level of said drive signal into said inverse function to determine said drive signal.

9. Meter electronics for a flow measuring apparatus for measuring properties of a material; said apparatus has at least one flow tube that receives material, a driver for vibrating said at least one flow tube, pick-off sensors for measuring vibrations of said at least one flow tube at points along said flow tube, said meter electronics including drive circuitry for applying a drive signal to said driver to cause said driver to oscillate said at least one flow tube and circuitry for measuring properties of a material flow in said at least one flow tube, said meter electronics further comprising:

first circuitry that receives signals from said pick-off sensors and detects physical characteristics of said apparatus and said driver from said measured vibrations of said at least one flow tube, the first circuitry also includes modeling circuitry that models dynamics of said apparatus and driver from said measured vibrations; and second circuitry responsive to the receipt of said signals for defining a drive signal that causes said driver to oscillate said at least one flow tube in a desired mode of vibration from said physical characteristics of said apparatus and said driver.

10. The meter electronics of claim 9 further comprising:
a memory that stores measurements of vibrations of said at least one flow tube.

11. The meter electronics of claim 10 wherein said first circuitry further comprises:
circuitry that combines a present measurement of vibrations and said stored measurements of vibrations to determine said physical characteristics.

12. The meter electronics of claim 9 further comprising:
a reference voltage in a drive signal circuit set to a level to generate said drive signal responsive to determining said drive signal to cause said drive signal circuit to generate said drive signal.

13. The meter electronics of claim 9 further comprising:
timing circuitry that periodically repeats calibration of said drive signal.

14. The meter electronics of claim 9 wherein said second circuitry includes:
circuitry that calculates coefficients of polynomials for a function relating a drive signal to force applied to said conduits;
circuitry that determines coefficients of polynomials of an inverse function of said function for relating said drive signal to said force; and
circuitry that inserts a command signal of said current drive signal into said inverse function to determine said drive signal.

15. A product for calibrating a drive signal to be applied to a driver to cause said driver to oscillate at least one flow tube in flow measuring apparatus for measuring properties of a material flowing through said at least one flow tube, said product comprising:
instructions for directing a processor to:
receive signals measuring vibrations of said at least one flow tube from pick-off sensors affixed to said at least one flow tube, and
model dynamics of said apparatus and driver from said measured vibrations, and
detect physical characteristics of said apparatus and said driver from said modeled dynamics, and
define a drive signal that causes said driver to oscillate said at least one flow tube in a desired mode of vibration from said physical characteristics of said apparatus and said driver; and
a media readable by said processor that stores said instructions.

16. The product of claim 15 wherein said instructions further comprise:
instructions directing said processor to apply said drive signal to said driver to cause said driver to oscillate said at least one flow tube in said desired mode.

17. The product of claim 16 wherein said instructions for directing said processor to detect said physical characteristics of said apparatus and said driver further comprise:
instructions for directing said processor to read said measurements from said memory and to combine a present measurement of vibrations and said stored measurements of vibrations to determine said physical characteristics.

18. The product of claim 15 wherein said instructions further comprise:
instructions for directing said processor to store measurements of said vibrations of said at least one flow tube in a memory.

19. The product of claim 15 wherein said instructions further comprise:
instructions for directing said processor to display a reference voltage for a drive signal circuit responsive to determining said drive signal to cause said drive signal circuit to generate said drive signal.

20. The product of claim 15 wherein said instructions further comprise:
instructions for directing said processor to periodically repeat calibration said drive signal.

21. The product of claim 15 wherein said instructions for directing said processor to determine said drive signal comprises:
instructions for directing said processor to calculate coefficients of polynomials for a function relating a drive signal to force applied to said conduits, determine coefficients of polynomials of an inverse function of said function for relating said drive signal to said force, and insert a command signal of said drive signal into said inverse function to determine said drive signal.

* * * * *

UNITED STATES PATENT AND TRADEMARK OFFICE
CERTIFICATE OF CORRECTION

PATENT NO. : 6,378,354 B1
DATED : April 30, 2002
INVENTOR(S) : Thomas Dean Sharp It is certified that error appears in the above-identified patent and that said Letters Patent is hereby corrected as shown below:

Column 6,
Line 55, replace "sive to said vibratings" with -- sive to said vibrations; --

Column 8,
Line 13, replace "vibrations of flow tubes 103A an 103B." with -- vibrations of flow tubes 103A and 103B. --

Column 11,
Line 2, replace "x=all measured vibrations" with -- x=all measured vibrations --
Line 3, replace "x=the state of the system;" with -- $x$ =the state of the system; --
Line 4, replace "r=the input into the system (the drive signal);" with -- $r$ =the input into the system the drive signal); --
Line 5, replace "y=the output of the system; and" with -- y =the output of the sytem; and --
Line 23, replace "$x = A\ x + Bf_a\ (r);$" with -- $x = Ax + Bf_a\ (r);$ --
Line 28, replace "A,B,C,D=are matrices that model the structural dynamics" with -- $A,B,C,D$ =are matrices that model the structural dynamics --
Line 42, replace "$f_a^{-1}\ (r) = a_0 + a\ +_1\ r + a_2r^2 + a_3r^3 + a_4r^4 +$" with -- $f_a^{-1}\ (r) = a_0 + a_1r + a_2r^2 + a_3r^3 + a_4r^4 + \ldots$ --
Line 67, replace $x = A\ x + B(\beta_0 + \beta_1r + \beta_2r^2 + \beta_3r^3)$ and" with -- $x = Ax + B(\beta_0 + \beta_1r + \beta_2r^2 + \beta_3r^3)$ and --

Column 12,
Line 25, replace "function such that the equation $f_{a(r).}f_a^{-1}(r) = 1$. However," with -- function such that the equation $f_a\ (r) \cdot f_a^{-1}\ (r) = 1$. However, --
Line 37-39 replace "
$$A= \begin{matrix} 1 & 0 \end{matrix} \quad\quad H12L$$
" with -- $$\text{with } -- A = \begin{bmatrix} 1.403 & -.9844 \\ 1 & 0 \end{bmatrix}$$ --

Line 40,
replace "
$$B= \begin{matrix} 1 \\ 0 \end{matrix} \quad\quad H13L$$
" with -- $$B = \begin{bmatrix} 1 \\ 0 \end{bmatrix}$$ --

UNITED STATES PATENT AND TRADEMARK OFFICE
CERTIFICATE OF CORRECTION

PATENT NO. : 6,378,354 B1
DATED : April 30, 2002
INVENTOR(S) : Thomas Dean Sharp It is certified that error appears in the above-identified patent and that said Letters Patent is hereby corrected as shown below:

Line 48, replace "The firs step is to use a signal generator to apply a band" with
-- The first step is to use a signal generator to apply a band --

Column 16,
Line 23, replace "where A, B, C, and D, can be resolved by" with -- state space matrices
$A$, $B$, $C$, and $D$, can be resolved by --
Line 57, replace "the state space matrices A, B, C, and D matrices are" with -- the state space matrices $A$, $B$, $C$ and $D$ matrices are --

Column 17,
Line 16, replace "matrices A, B, C, and D of" with -- matrices $A$, $B$, $C$ and $D$ of --
Line 18, replace $A = \begin{bmatrix} 1 & 0 \end{bmatrix}$ "

with  (12) --

Signed and Sealed this

First Day of April, 2003

*JAMES E. ROGAN*
*Director of the United States Patent and Trademark Office*

UNITED STATES PATENT AND TRADEMARK OFFICE
CERTIFICATE OF CORRECTION

PATENT NO. : 6,378,354 B1
DATED : April 30, 2002
INVENTOR(S) : Thomas Dean Sharp It is certified that error appears in the above-identified patent and that said Letters Patent is hereby corrected as shown below:

Column 6,
Line 55, replace "sive to said vibratings;" with -- sive to said vibrations; --

Column 8,
Line 13, replace "vibrations of flow tubes 103A an 103B." with -- vibrations of flow tubes 103A and 103B. --

Column 11,
Line 2, replace "$\dot{x}$ =all measured vibrations" with -- $\dot{x}$ =all measured vibrations --
Line 3, replace "x=the state of the system;" with -- $x$ =the state of the system; --
Line 4, replace "r=the input into the system (the drive signal);" with -- $r$ =the input into the system (the drive signal); --
Line 5, replace "y=the output of the system; and" with -- $y$ =the output of the system; and --
Line 23, replace    replace "$\dot{x} = Ax + Bf_a(r);$"

with -- $\dot{x} = Ax + Bf_a(r);$ --

Line 28, replace "A,B,C,D=are matrices that model the structural dynamics" with
-- $A,B,C,D$ =are matrices that model the structural dynamics --
Line 42, replace "$f_a^{-1}(r)=a_o+a+_1r+a_2r^2+ a_3r^3+ a_4r^4+$" with -- $f_a^{-1}(r)=a_0+a_1r+ a_2r^2+ a_3r^3 +a_4r^4+.....$ --
Line 67,    replace "$\dot{x} = Ax + B(\beta_0 + \beta_1 r + \beta_2 r^2 + \beta_3 r^3)$ and"

with -- $\dot{x} = Ax + B(\beta_0 + \beta_1 r + \beta_2 r^2 + \beta_3 r^3)$ and--

Column 12,
Line 25, replace "function such that the equation $f_{a(r) \cdot fa}^{-1}(r)=1$. However," with
-- function such that the equation $f_a(r) \cdot f_a^{-1}(r) =1$. However, --
Line 37-39,  replace "
$$A= \begin{matrix} 1.403 & -.9844 \\ 1 & 0 \end{matrix}$$
H12L"

with -- $A = \begin{bmatrix} 1.403 & -.9844 \\ 1 & 0 \end{bmatrix}$    (12) --

Line 40,    replace "
$$B= \begin{matrix} 1 \\ 0 \end{matrix}$$
H13L"

with -- $B = \begin{bmatrix} 1 \\ 0 \end{bmatrix}$    (13)--

UNITED STATES PATENT AND TRADEMARK OFFICE
CERTIFICATE OF CORRECTION

PATENT NO. : 6,378,354 B1
DATED : April 30, 2002
INVENTOR(S) : Thomas Dean Sharp It is certified that error appears in the above-identified patent and that said Letters Patent is hereby corrected as shown below:

Column 12 cont'd,
Line 48, replace "The firs step is to use a signal generator to apply a band" with
-- The first step is to use a signal generator to apply a band --

Column 16,
Line 23, replace "where A, B, C, and D, are state space matrices comprising" with
-- $A, B, C$ and $D$, are state space matrices comprising --
Line 51, replace "state space matrices A, B, C, and D can be resolved by" with
-- state space matrices $A, B, C,$ and $D$ , can be resolved by --
Line 57, replace "the state space matrices A, B, C, and D matrices are" with -- the state space matrices $A, B, C$ and $D$ matrices are --

Column 17,
Line 16, replace "matrices A, B, C, and D of" with -- matrices $A, B, C$ and $D$ of --
Line 18, replace "$A = \begin{matrix} 1.403 & -.9844 \\ 1 & 0 \end{matrix}$" with -- $A = \begin{bmatrix} 1.403 & -.9844 \\ 1 & 0 \end{bmatrix}$ --

Line 21, replace "$B = \begin{matrix} 1 \\ 0 \end{matrix}$ H13L" with -- $B = \begin{bmatrix} 1 \\ 0 \end{bmatrix}$ --

Column 18,
Line 30, replace "storing a measurement of said vibration of said at least" with
-- storing a measurement of said vibrations of said at least --
Line 41, replace "sive to determining said drive signal to cause said drive" with
-- sive to defining said drive signal to cause said drive --
Line 53, replace "8. The method of claim 1 wherein said step of determining" with
-- 8. The method of claim 1 wherein said step of defining --
Line 57, replace "relating a drive signal to force applied to said conduits;" with
-- relating a drive signal to force applied to said at least one flow tube --
Line 62, replace "inverse function to determine said drive signal." with
-- inverse function to define said drive signal. --

UNITED STATES PATENT AND TRADEMARK OFFICE
CERTIFICATE OF CORRECTION

PATENT NO. : 6,378,354 B1
DATED : April 30, 2002
INVENTOR(S) : Thomas Dean Sharp It is certified that error appears in the above-identified patent and that said Letters Patent is hereby corrected as shown below:

Column 19,
Line 29, replace "to generate said drive signal responsive to determining" with
-- to generate said drive signal responsive to defining --
Line 40, replace "conduits;" with -- at least one flow tube; --

Column 20,
Lines 19-26, replace
"17. The product of claim 16 wherein said instructions for
direction said processor to detect said physical characteristics
of said apparatus and said driver further comprise: instructions for directing
said processor to read said measurements from said memory and to combine
a present measurement of vibrations to determine said physical
characteristics."
with -- 17. The product of claim 15 wherein said instructions further comprise:
instructions for directing said processor to store measurements of said
vibrations of said at least one flow tube in a memory. --

Lines 26-30, replace
"18. The product of claim 15 wherein said instructions further comprise:
instructions for directing said processor to store measurements of
said vibrations of said at least one flow tube in a memory."
with -- 18. The product of claim 17 wherein said instructions for
directing said processor to detect said physical characteristics of
said apparatus and said driver further comprise:
instructions for directing said processor to read said
measurements from said memory and to combine a present
measurement of vibrations and said stored measurements of
vibrations to determine said physical characteristics. --

Line 35, replace "determining said drive signal to cause said drive signal"
with -- defining said drive signal to cause said drive signal --
Line 40, replace "repeat calibration said drive signal." with
-- repeat calibration of said drive signal. --

UNITED STATES PATENT AND TRADEMARK OFFICE
CERTIFICATE OF CORRECTION

PATENT NO. : 6,378,354 B1
DATED : April 30, 2002
INVENTOR(S) : Thomas Dean Sharp It is certified that error appears in the above-identified patent and that said Letters Patent is hereby corrected as shown below:

Column 20 cont'd,
Line 42, replace "directing said processor to determine said drive signal"
with -- directing said processor to define said drive signal --
Line 47, replace "signal to force applied to said conduits, determine" with
-- signal to force applied to said at least one flow tube, determine --

Signed and Sealed this

Sixth Day of May, 2003

JAMES E. ROGAN
*Director of the United States Patent and Trademark Office*